United States Patent
Lee et al.

(10) Patent No.: US 7,340,322 B2
(45) Date of Patent: Mar. 4, 2008

(54) RUBBING APPARATUS FOR LIQUID CRYSTAL DISPLAY PANEL AND METHOD THEREOF

(75) Inventors: Jeong-Joon Lee, Daegu (KR); Hyun-Ho Song, Gyeongsangbuk-Do (KR); Joung-Won Choi, Busan (KR)

(73) Assignee: LG.Philips LCD Co., Ltd., Seoul (KR)

( * ) Notice: Subject to any disclaimer, the term of this patent is extended or adjusted under 35 U.S.C. 154(b) by 650 days.

(21) Appl. No.: 10/975,468

(22) Filed: Oct. 29, 2004

(65) Prior Publication Data

US 2005/0096791 A1  May 5, 2005

(30) Foreign Application Priority Data

Oct. 31, 2003  (KR) ...................... 10-2003-0076951

(51) Int. Cl.
  *G06F 19/00* (2006.01)
(52) U.S. Cl. ...................... 700/245; 700/247; 700/249; 349/117; 349/127; 349/136; 349/149
(58) Field of Classification Search ................ 700/245, 700/247, 249; 349/117, 127, 129, 136, 149, 349/240
  See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron | |
| 4,691,995 A | 9/1987 | Yamazaki | |
| 4,775,225 A | 10/1988 | Tsuboyama | |
| 5,247,377 A | 9/1993 | Omeis | |
| 5,263,888 A | 11/1993 | Ishihara | |
| 5,379,139 A | 1/1995 | Sato | |
| 5,406,989 A | 4/1995 | Abe | |
| 5,499,128 A | 3/1996 | Hasegawa | |
| 5,507,323 A | 4/1996 | Abe | |

(Continued)

FOREIGN PATENT DOCUMENTS

EP   1 003 066 A1   5/2000

(Continued)

*Primary Examiner*—Thomas Black
*Assistant Examiner*—McDieunel Marc
(74) *Attorney, Agent, or Firm*—McKenna Long & Aldridge LLP

(57) ABSTRACT

A rubbing apparatus and method for liquid crystal display panels are provided. The apparatus includes at least one cassette for keeping at least one mother substrate to be rubbed, an internal port for keeping at least one dummy substrate for performing alignment of a rubbing material, at least one rubbing unit for receiving the at least one mother substrate from the at least one cassette to perform a rubbing thereon using the rubbing material, or receiving the at least one dummy substrate from the internal port to perform an alignment process of the rubbing material, and a robot for transferring or returning the at least one mother substrate kept in the at least one cassette, the at least one dummy substrate kept in the internal port, the at least one mother substrate which has been rubbed in the at least one rubbing unit, or the at least one dummy substrate on which the alignment process of the rubbing material has been performed.

18 Claims, 2 Drawing Sheets

U.S. PATENT DOCUMENTS

| | | | |
|---|---|---|---|
| 5,511,591 A | 4/1996 | Abe | |
| 5,539,545 A | 7/1996 | Shimizu | |
| 5,548,429 A | 8/1996 | Tsujita | |
| 5,642,214 A | 6/1997 | Ishii | |
| 5,666,178 A * | 9/1997 | Hirata et al. | 349/136 |
| 5,680,189 A | 10/1997 | Shimizu | |
| 5,742,370 A | 4/1998 | Kim | |
| 5,757,451 A | 5/1998 | Miyazaki | |
| 5,852,484 A | 12/1998 | Inoue | |
| 5,854,664 A | 12/1998 | Inoue | |
| 5,861,932 A | 1/1999 | Inata | |
| 5,875,922 A | 3/1999 | Chastine | |
| 5,952,676 A | 9/1999 | Sato | |
| 5,956,112 A | 9/1999 | Fujimori | |
| 6,001,203 A | 12/1999 | Yamada | |
| 6,011,609 A | 1/2000 | Kato | |
| 6,016,178 A | 1/2000 | Kataoka | |
| 6,016,181 A | 1/2000 | Shimada | |
| 6,055,035 A | 4/2000 | Von Gutfeld | |
| 6,163,357 A | 12/2000 | Nakamura | |
| 6,219,126 B1 | 4/2001 | Von Gutfeld | |
| 6,226,067 B1 | 5/2001 | Nishiguchi | |
| 6,236,445 B1 | 5/2001 | Foschaar | |
| 6,304,306 B1 | 10/2001 | Shiomi | |
| 6,304,311 B1 | 10/2001 | Egami | |
| 6,337,730 B1 | 1/2002 | Ozaki | |
| 6,414,733 B1 | 7/2002 | Ishikawa | |
| 6,661,488 B1 * | 12/2003 | Takeda et al. | 349/117 |
| 2002/0187593 A1 * | 12/2002 | Walker et al. | 438/149 |
| 2003/0190419 A1 * | 10/2003 | Katagami et al. | 427/240 |
| 2004/0119924 A1 * | 6/2004 | Takeda et al. | 349/129 |
| 2007/0064187 A1 * | 3/2007 | Takeda et al. | 349/127 |

FOREIGN PATENT DOCUMENTS

| | | |
|---|---|---|
| JP | 51-65656 | 6/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-313870 | 11/1994 |
| JP | 07-084268 | 3/1995 |
| JP | 07-128674 | 5/1995 |
| JP | 07-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 09-005762 | 1/1997 |
| JP | 09-026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-281511 | 10/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |

| | | | | | |
|---|---|---|---|---|---|
| JP | 2001-091727 | 4/2001 | JP | 2002-107740 | 4/2002 |
| JP | 2001-117105 | 4/2001 | JP | 2002-122870 | 4/2002 |
| JP | 2001-117109 | 4/2001 | JP | 2002-122872 | 4/2002 |
| JP | 2001-133745 | 5/2001 | JP | 2002-122873 | 4/2002 |
| JP | 2001-133794 | 5/2001 | JP | 2002-131762 | 5/2002 |
| JP | 2001-133799 | 5/2001 | JP | 2002-139734 | 5/2002 |
| JP | 2001-142074 | 5/2001 | JP | 2002-156518 | 5/2002 |
| JP | 2001-147437 | 5/2001 | JP | 2002-169166 | 6/2002 |
| JP | 2001-154211 | 6/2001 | JP | 2002-169167 | 6/2002 |
| JP | 2001-166272 | 6/2001 | JP | 2002-182222 | 6/2002 |
| JP | 2001-166310 | 6/2001 | JP | 2002-202512 | 7/2002 |
| JP | 2000-201750 | 7/2001 | JP | 2002-202514 | 7/2002 |
| JP | 2001-183683 | 7/2001 | JP | 2002-214626 | 7/2002 |
| JP | 2001-209052 | 8/2001 | JP | 2002-229042 | 8/2002 |
| JP | 2001-209056 | 8/2001 | JP | 2002-236276 | 8/2002 |
| JP | 2001-209057 | 8/2001 | JP | 2002-258299 | 8/2002 |
| JP | 2001-209058 | 8/2001 | JP | 2002-236292 | 9/2002 |
| JP | 2001-209060 | 8/2001 | JP | 2002-277865 | 9/2002 |
| JP | 2001-215459 | 8/2001 | JP | 2002-277866 | 9/2002 |
| JP | 2001-222017 | 8/2001 | JP | 2002-277881 | 9/2002 |
| JP | 2001-235758 | 8/2001 | JP | 2002-287156 | 10/2002 |
| JP | 2001-255542 | 9/2001 | JP | 2002-296605 | 10/2002 |
| JP | 2001-264782 | 9/2001 | JP | 2002-311438 | 10/2002 |
| JP | 2001-272640 | 10/2001 | JP | 2002-311440 | 10/2002 |
| JP | 2001-281675 | 10/2001 | JP | 2002-311442 | 10/2002 |
| JP | 2001-281678 | 10/2001 | JP | 2002-323687 | 11/2002 |
| JP | 2001-282126 | 10/2001 | JP | 2002-323694 | 11/2002 |
| JP | 2001-305563 | 10/2001 | JP | 2002-333628 | 11/2002 |
| JP | 2001-330837 | 11/2001 | JP | 2002-333635 | 11/2002 |
| JP | 2001-330840 | 11/2001 | JP | 2002-333843 | 11/2002 |
| JP | 2001-356353 | 12/2001 | JP | 2002-341329 | 11/2002 |
| JP | 2001-356354 | 12/2001 | JP | 2002-341355 | 11/2002 |
| JP | 2002-014360 | 1/2002 | JP | 2002-341356 | 11/2002 |
| JP | 2002-023176 | 1/2002 | JP | 2002-341357 | 11/2002 |
| JP | 2002-049045 | 2/2002 | JP | 2002-341358 | 11/2002 |
| JP | 2002-079160 | 3/2002 | JP | 2002-341359 | 11/2002 |
| JP | 2002-080321 | 3/2002 | JP | 2002-341362 | 11/2002 |
| JP | 2002-082340 | 3/2002 | KR | 2000-0035302 | 6/2000 |
| JP | 2002-090759 | 3/2002 | | | |
| JP | 2002-090760 | 3/2002 | | | |

* cited by examiner

US 7,340,322 B2

RUBBING APPARATUS FOR LIQUID CRYSTAL DISPLAY PANEL AND METHOD THEREOF

This application claims the benefit of patent application Ser. No. 10-2003-0076951 filed in Republic of Korea on Oct. 31, 2003, the entire contents of which are herein fully incorporated by reference.

BACKGROUND OF THE INVENTION

1. Field of the Invention

The present invention relates to a rubbing apparatus for a liquid crystal display panel and, more particularly, to a rubbing apparatus for a liquid crystal display panel and method of aging rubbing cloth for rubbing an alignment film formed on a large-scale mother substrate using an automated system.

2. Description of the Related Art

In general, a liquid crystal display is a display device in which data signals having image information are individually supplied to pixels arranged in a matrix form and light transmittance of the pixels is controlled to thereby display a desired image.

Thus, the liquid crystal display includes a liquid crystal display panel on which pixels are arranged in a matrix form and a driving circuit for driving the pixels.

A liquid crystal display panel includes a thin film transistor array substrate and an attached color filter substrate with a uniform cell gap therebetween in a facing manner, and a liquid crystal layer formed in the separated gap between the color filter substrate and the thin film transistor array substrate.

An alignment film is formed at each facing surface of the thin film transistor array substrate and the color filter substrate, and a rubbing process proceeds on the alignment film so that liquid crystals of the liquid crystal layer may be arranged in a certain direction on the alignment film.

A common electrode and a pixel electrode are formed in the liquid crystal display panel as the thin film transistor array substrate and the color filter substrate are attached, in order to apply an electric field to the liquid crystal layer.

If a voltage is applied to the common electrode, when a voltage of a data signal applied to the pixel electrode is controlled, liquid crystals of the liquid crystal layer are rotated by dielectric anisotropy according to the electric field between the common electrode and the pixel electrode, in order to transmit or block light by the pixels to thereby display a text or an image.

A fabrication process of the liquid crystal display panel in accordance with a related art will now be described in detail.

Though not shown, in the fabrication process of the liquid crystal display panel, first, thin film transistor array substrates are formed on a first mother substrate, and color filter substrates are formed on a second mother substrate.

Pixels are arranged in a matrix form on each thin film transistor array substrate. A thin film transistor, a pixel electrode and a capacitor are formed at each unit pixel of each thin film transistor array substrate. A common electrode, a color filter and a black matrix are patterned on each color filter substrate.

After an alignment film is formed at each surface of the first and second mother substrates, a rubbing process is performed. In the rubbing process, a rubbing cloth rubs the surface of the alignment film with uniform pressure at a uniform speed, so that polymer chains at the surface of the alignment film are aligned in a certain direction and liquid crystals are arranged in a certain direction.

Subsequently, the alignment films respectively formed at each surface of the first and second mother substrates are attached in a facing manner to fabricate a plurality of liquid crystal display panels. In this case, a spacer is formed between the first and second mother substrates to have a uniform cell gap therebetween.

Then, the first and second mother substrates, attached as described above, are cut and processed to separate the plurality of liquid crystal display panels.

A method of rubbing the alignment film according to a related art will be described in detail with reference to FIG. 1 as follows.

FIG. 1 is a view showing an example of rubbing the alignment film formed on the large-scale mother substrate in accordance with a related art.

As shown in FIG. 1, in the related art method for rubbing the alignment film, first, after an alignment film 11 formed of polyimide or the like is formed on a mother substrate 10, a roller 14 with rubbing cloth 13 wound thereon is installed to be inclined at a certain angle ($\theta$) from a longer side of the mother substrate 10. Then, the rubbing cloth 13 is rubbed on the alignment film 11 by moving the mother substrate 10 in a direction parallel to the longer side of the mother substrate 10, thereby rubbing the alignment film 11.

In this case, before a new rubbing cloth wound on the roller 14 is used during a mass production of liquid crystal display panels, it is subjected to an alignment process in which it is rubbed on a dummy substrate for a certain time. But if the new rubbing cloth is directly used in the mass production without the rubbing cloth alignment process, defective rubbing may occur in the direction parallel to the longer side of the mother substrate 10 on the alignment film due to non-alignment of the new rubbing cloth.

Moreover, the rubbing cloth alignment process can be also performed when defective rubbing occurs on the alignment film 11 formed on the mother substrate 10 during the actual mass production of the liquid crystal display panels. Namely, if a defective rubbing on the alignment film 11 is detected during a process of the actual mass production where the alignment film 11 formed on the mother substrate 10 is rubbed by applying the rubbing cloth 13 which has already undergone the rubbing cloth alignment process, the process of aligning the rubbing cloth 13 by rubbing it on the dummy substrate for certain time is performed again to remove the rubbing-defective portion of the alignment film 11.

The dummy substrate is made of the substantially same material and has the same size as the mother substrate 10 used for the actual mass production.

FIG. 2 is an exemplary view showing a layout of a rubbing apparatus of a liquid crystal display panel in accordance with the related art.

As shown in FIG. 2, the rubbing apparatus for the liquid crystal display panels includes at least one cassette 21 for keeping mother substrates to be rubbed, a plurality of rubbing units 22 for receiving the mother substrates kept in the cassettes 21 and for performing a rubbing thereon, a robot 23 for conveying or returning the mother substrates kept in the cassettes 21 or mother substrates that have been rubbed by the rubbing units 22, and an external port 24 for keeping dummy substrates to be aligned by the rubbing cloth.

Herein, the dummy substrates kept at the external port 24 are transferred to or returned from the rubbing units 22 by a manual operation of an operator.

The rubbing units 22 receive the mother substrates to be subjected to rubbing from the robot 23 and perform rubbing thereon. In general, the rubbing cloth is replaced with a new one after rubbing 400 sheets of mother substrates.

As mentioned above, the replaced new rubbing cloth needs to undergo the alignment process where it is rubbed on the dummy substrate for a certain time, before performing rubbing on the mother substrates. For the new rubbing cloth to be aligned, the operator manually transfers the dummy substrates kept in the external port 24 to the rubbing unit 22, and after the rubbing cloth alignment process is completed, the operator manually returns the dummy substrates to the external port 24 from the rubbing units 22.

If defective rubbing of the mother substrates is detected after the mother substrates are rubbed in the rubbing unit 22, the operator can manually move the dummy substrates kept in the external port 24 to the rubbing units 22 to perform the alignment process by rubbing the rubbing cloth on the dummy substrates for a certain time again, in order to remove a rubbing-defective portion of the mother substrates.

After the rubbing cloth re-alignment process is completed, the operator manually returns the dummy substrates to the external port 24 from the rubbing units 22.

As mentioned above, the above rubbing apparatus has the following problems.

In order to perform the rubbing cloth alignment process, the operator should manually transfer the dummy substrate kept in the external port to the rubbing unit, and then, after the rubbing cloth alignment is completed, the operator should manually return the dummy substrate from the rubbing unit. This causes the operator an inconvenience, increases fatigue and delays the time required for transferring or returning the dummy substrate, resulting in the degradation of productivity.

As the mother substrates increase in size in line with the trend of large-scale liquid crystal display panels, the size of the dummy substrate increases, making it very difficult for the operator to manually transfer or return the dummy substrate, and in a worst case, it may not be possible to transfer or return the dummy substrate.

SUMMARY OF THE INVENTION

Therefore, one object of the present invention is to provide a rubbing apparatus for a liquid crystal display panel and method thereof capable of transferring or returning a dummy substrate in order to age rubbing cloth for rubbing an alignment film formed on a large-scale mother substrate by an automated system.

Another object of the present invention is to provide a rubbing apparatus and method for a display device, which overcome the limitations associated with the related art.

To achieve these and other advantages and in accordance with the purpose of the present invention, as embodied and broadly described herein, according to an aspect of the invention there is provided rubbing apparatus for a liquid crystal display panel, the apparatus comprising at least one cassette for keeping at least one mother substrate to be rubbed, an internal port for keeping at least one dummy substrate for performing alignment of a rubbing material, at least one rubbing unit for receiving the at least one mother substrate from the at least one cassette to perform a rubbing thereon using the rubbing material, or receiving the at least one dummy substrate from the internal port to perform an alignment process of the rubbing material, and a robot for transferring or returning the at least one mother substrate kept in the at least one cassette, the at least one dummy substrate kept in the internal port, the at least one mother substrate which has been rubbed in the at least one rubbing unit, or the at least one dummy substrate on which the alignment process of the rubbing material has been performed.

According to an aspect of the invention, there is provided a rubbing method for a liquid crystal display panel, the method comprising keeping at least one mother substrate to be rubbed in at least one cassette, keeping at least one dummy substrate in an internal port, the at least one dummy substrate being used to perform an alignment process of a rubbing material, automatically transferring the at least one mother substrate kept in the at least one cassette, or the at least one dummy substrate kept in the internal port to at least one rubbing unit by a robot, and rubbing by the at least one rubbing unit the at least one mother substrate transferred to the at least one rubbing unit using the rubbing material, or performing the alignment process of the rubbing material on the at least one dummy substrate.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

An exemplary rubbing apparatus and an exemplary method for a liquid crystal display panel in accordance with the present invention will now be described with reference to the accompanying drawings.

Figure 1:
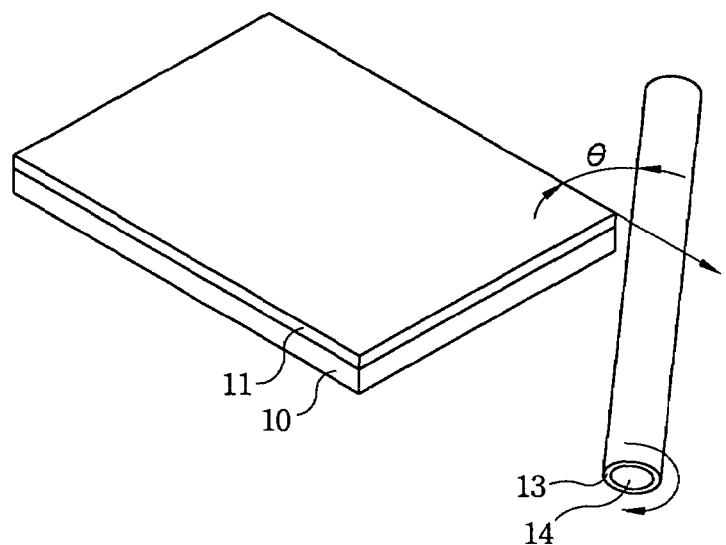
FIG. 1 is a view showing an example of rubbing an alignment film formed on the large-scale mother substrate in accordance with a related art.
Figure 2:
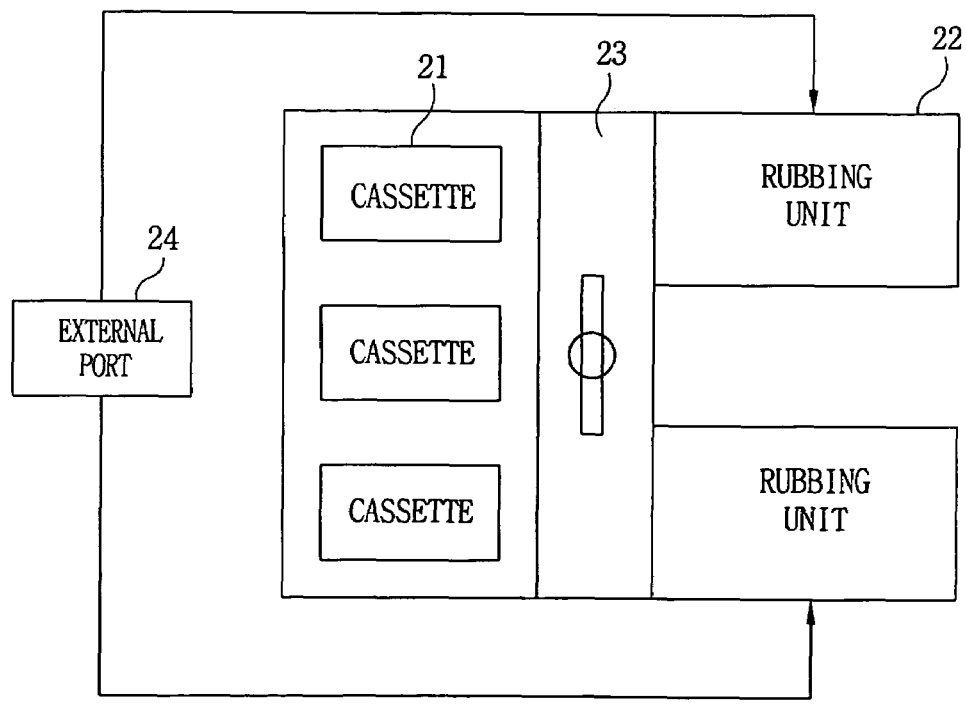
FIG. 2 is an exemplary view showing a layout of a rubbing apparatus of a liquid crystal display panel in accordance with the related art.
Figure 3:
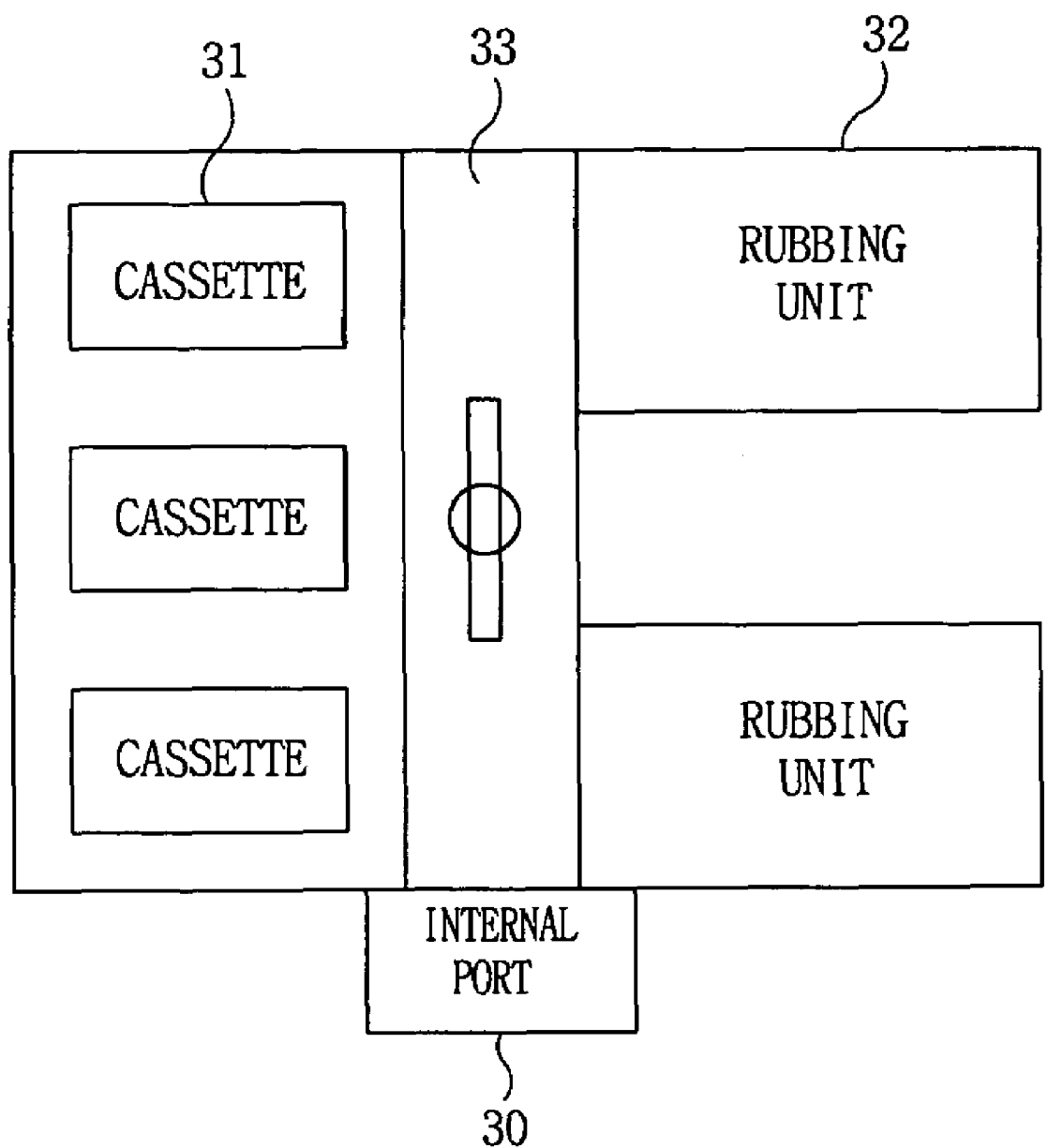
FIG. 3 is an exemplary view showing a layout of a rubbing apparatus of a liquid crystal display panel in accordance with an embodiment of the present invention.

FIG. 3 is a view showing an exemplary layout of a rubbing apparatus of a liquid crystal display panel in accordance with the present invention.

With reference to FIG. 3, the rubbing apparatus for a liquid crystal display panel includes at least one cassette 31 for keeping mother substrates to be rubbed, an internal port 30 for keeping dummy substrates for performing an alignment process of rubbing cloth, a plurality of rubbing units 32 for receiving the mother substrates from the cassettes 31 to perform rubbing thereon, or receiving the dummy substrates from the internal port 30 to perform an alignment process of the rubbing cloth, and a robot 33 for transferring or returning the mother substrates kept in the plurality of cassettes 31, the dummy substrates kept in the internal port 30, the mother substrates which have been rubbed in the plurality of rubbing units 32 or the dummy substrates where the alignment process of the rubbing cloth has been performed. All the components of the rubbing apparatus are operatively coupled. For instance, the robot 33 includes a controller (e.g., microprocessor) to control internally the operation/movement of the robot 33.

The internal port 30 is connected to the robot 33 in order to automatically move the mother substrates or the dummy substrates to the cassettes 31 and the rubbing units 32. One or more cassettes may be provided in the internal part 30 to store therein the dummy substrates. Accordingly, the dummy substrates kept in the internal port 30 are automatically transferred to returned to and from the rubbing units 32 by the robot 33.

In the rubbing apparatus for a liquid crystal display panel constructed as described above in accordance with the present invention, in order to rub the large-scale mother substrate, an alignment film formed of polyimide is formed on the mother substrate, a roller with rubbing cloth wound thereon is installed to be inclined at a certain angle (θ) from a longer side of the mother substrate, the rubbing cloth is rubbed on the alignment film while moving the mother substrate in a direction parallel to the longer side of the mother substrate, thereby aligning polymer chains at the surface of the alignment film in a certain direction to make the liquid crystals be arranged in a certain direction.

The rubbing units 32 receive the mother substrates to be subjected to rubbing through the robot 33 and perform rubbing thereon. In general, the rubbing cloth is replaced with a new one after rubbing, e.g., 400 sheets of mother substrates.

The replaced new rubbing cloth needs to undergo an alignment process where it is rubbed on the dummy substrate for a certain time.

The dummy substrates kept in the internal port 30 are then automatically transferred to the rubbing unit 32 by the operation of the robot 33, and then, after the alignment process of the rubbing is completed, the dummy substrates are automatically transferred back to the internal port 30 from the rubbing unit 32.

If defective rubbing of the mother substrates is observed after the mother substrates are rubbed in the rubbing unit 22, the dummy substrates kept in the internal port 30 are automatically transferred to the rubbing units 32 by the robot 33 to perform the alignment process for rubbing the rubbing cloth on the dummy substrates again for a certain time, in order to remove a rubbing-defective portion of the mother substrates.

After the re-alignment process of the rubbing cloth is completed, the dummy substrates are automatically returned to the internal port 30 from the rubbing units 32. The dummy substrates kept in the internal port 30 are made of substantially the same material and have the same or substantially the same size as the mother substrates applied for an actual mass production, and an alignment film formed of polyimide or the like may be formed on the dummy substrate. In addition, a cassette loaded with the dummy substrates may be loaded into the internal port 30.

As so far described, the rubbing apparatus and method for liquid crystal display panels in accordance with the present invention have many advantages.

For example, the dummy substrates kept in the internal port are automatically transferred to the rubbing unit by the robot to perform the rubbing cloth alignment process, and then, after the alignment process of the rubbing cloth is completed, the dummy substrates are automatically returned to the internal port from the rubbing unit by the robot.

In addition, if defective rubbing of the mother substrate is observed after the mother substrate is rubbed in the rubbing unit, the dummy substrate kept in the internal port is automatically transferred to the rubbing unit by the robot to perform the alignment process of the rubbing cloth again. Then, the rubbing-defective portion of the mother substrates is removed, the re-alignment process of the rubbing cloth is completed, and then the dummy substrate is automatically returned to the internal port from the rubbing unit by the robot.

Thus, the alignment process of the rubbing cloth can be conveniently and automatically performed without the manual labor of the operator (person), and since a time required for transferring or returning the dummy substrate is shortened significantly, productivity of liquid crystal panels is increased greatly.

By automatically transferring or returning a dummy substrate by a robot to perform the alignment process of the rubbing cloth, it also facilitates the fabrication of a large-scale liquid crystal display panel to which a large-scale mother substrate and a large-scale dummy substrate are applied.

As the present invention may be embodied in several forms without departing from the spirit or essential characteristics thereof, it should also be understood that the above-described exemplary embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A rubbing apparatus for a liquid crystal display panel, the apparatus comprising:
    at least one cassette for keeping at least one mother substrate to be rubbed;
    an internal port for keeping at least one dummy substrate for performing alignment of a rubbing material;
    at least one rubbing unit for receiving the at least one mother substrate from the at least one cassette to perform a rubbing thereon using the rubbing material, or receiving the at least one dummy substrate from the internal port to perform an alignment process of the rubbing material; and
    a robot for transferring or returning the at least one mother substrate kept in the at least one cassette, the at least one dummy substrate kept in the internal port, the at least one mother substrate which has been rubbed in the at least one rubbing unit, or the at least one dummy substrate on which the alignment process of the rubbing material has been performed.

2. The apparatus of claim 1, wherein the internal port is connected to the robot so that the at least one mother substrate and the at least one dummy substrate can be moved by the robot to the at least one cassette or to the at least one rubbing unit.

3. The apparatus of claim 1, wherein the at least one dummy substrate is formed of a same material as the at least one mother substrate.

4. The apparatus of claim 1, wherein the at least one dummy substrate has a same size as the at least one mother substrate.

5. The apparatus of claim 1, wherein an alignment film is on the at least one dummy substrate.

6. The apparatus of claim 5, wherein the alignment film comprises polyimide.

7. The apparatus of claim 1, wherein the internal port includes a cassette loaded with the at least one dummy substrate.

8. The apparatus of claim 1, wherein the rubbing material is a rubbing cloth.

9. A rubbing method for a liquid crystal display panel, the method comprising:

keeping at least one mother substrate to be rubbed in at least one cassette;

keeping at least one dummy substrate in an internal port, the at least one dummy substrate being used to perform an alignment process of a rubbing material;

automatically transferring the at least one mother substrate kept in the at least one cassette, or the at least one dummy substrate kept in the internal port to at least one rubbing unit by a robot; and rubbing by the at least one rubbing unit the at least one mother substrate transferred to the at least one rubbing unit using the rubbing material, or performing the alignment process of the rubbing material on the at least one dummy substrate.

10. The method of claim 9, further comprising:

automatically returning to the internal port the at least one mother substrate kept in the at least one cassette, or the at least one dummy substrate kept in the internal port, or the at least one mother substrate which has been rubbed in the at least one rubbing unit, or the at least one dummy substrate on which the alignment process of the rubbing material has been performed in the at least one rubbing unit.

11. The method of claim 9, wherein the at least one dummy substrate is formed of a same material as the at least one mother substrate.

12. The method of claim 9, wherein the at least one dummy substrate has a same size as the at least one mother substrate.

13. The method of claim 9, further comprising:

forming an alignment film on the at least one dummy substrate on which the rubbing material is to be aligned, prior to the alignment process of the rubbing material.

14. The method of claim 13, wherein the alignment film is formed of polyimide.

15. The method of claim 9, further comprising:

loading into the internal port a cassette loaded with the at least one dummy substrate.

16. The method of claim 9, further comprising:

automatically transferring the at least one dummy substrate kept in the internal port by the robot to the at least one rubbing unit and rubbing the rubbing material on the at least one dummy substrate for several times, if defective rubbing of the at least one mother substrate after being rubbed is detected.

17. The method of claim 16, further comprising:

automatically returning the at least one dummy substrate to the internal port from the at least one rubbing unit after the re-alignment process of the rubbing material is completed.

18. The method of claim 9, wherein the rubbing material is a rubbing cloth.

* * * * *